US012394001B2

(12) United States Patent
Ahmadi et al.

(10) Patent No.: US 12,394,001 B2
(45) Date of Patent: Aug. 19, 2025

(54) CLOUD-BASED CONTACTLESS VENDING MACHINE

(71) Applicants: Bahar Ahmadi, Irvine, CA (US); Maryam Etminan, Irvine, CA (US)

(72) Inventors: Bahar Ahmadi, Irvine, CA (US); Maryam Etminan, Irvine, CA (US)

( * ) Notice: Subject to any disclaimer, the term of this patent is extended or adjusted under 35 U.S.C. 154(b) by 243 days.

(21) Appl. No.: 18/223,063

(22) Filed: Jul. 18, 2023

(65) Prior Publication Data

US 2024/0020777 A1    Jan. 18, 2024

Related U.S. Application Data

(60) Provisional application No. 63/390,231, filed on Jul. 18, 2022.

(51) Int. Cl.
*G06Q 50/12* (2012.01)
*G06Q 30/0601* (2023.01)

(52) U.S. Cl.
CPC ......... *G06Q 50/12* (2013.01); *G06Q 30/0631* (2013.01)

(58) Field of Classification Search
CPC ............................ G06Q 50/12; G06Q 30/0631
See application file for complete search history.

(56) References Cited

U.S. PATENT DOCUMENTS

| | | | |
|---|---|---|---|
| 9,721,060 | B2 | 8/2017 | Chung et al. |
| 10,515,340 | B2 | 12/2019 | Dhagumudi et al. |
| 11,017,624 | B2 | 5/2021 | Jain et al. |

(Continued)

FOREIGN PATENT DOCUMENTS

| | | | |
|---|---|---|---|
| CN | 207198990 U | | 4/2018 |
| KR | 20230109451 A | * | 7/2023 |
| WO | 2005111955 A1 | | 11/2005 |
| WO | 2020194255 A1 | | 10/2020 |
| WO | 2021026953 A1 | | 2/2021 |

OTHER PUBLICATIONS

Alberts Smoothies, Smoothie Robot: All You Need to Know About Alberts Smoothie Station, retrieved from URL: https://alberts.be/smoothie-robot/, accessed on Apr. 6, 2022, 15 pages.

(Continued)

*Primary Examiner* — A. Hunter Wilder
(74) *Attorney, Agent, or Firm* — Bauer and Joseph; Thomas Joseph (57) ABSTRACT

A vending machine has an essentially cylindrical body with a liquid meal mixing and dispensing assembly, an automated lid assembly, an automated straw dispensing assembly, and a voice recognition component. A server connects to the vending machine over a network, the server having memory for storing computer instructions and a processor for executing the computer instructions, the computer instructions including instructions for implementing an ingredients recommendation application with an artificial intelligence module for recommending ingredients for liquid meals. The voice recognition component is configured to receive an order to prepare a liquid meal in a container, so that the automated lid assembly can apply a lid to the container and insert the straw therein. The voice recommendation component can send the order to the artificial intelligence module to obtain liquid meal ingredients recommendations therefrom.

17 Claims, 9 Drawing Sheets

(56) References Cited

U.S. PATENT DOCUMENTS

| | | | |
|---|---|---|---|
| 11,046,573 B2* | 6/2021 | Rhule | F16K 31/58 |
| 2001/0002532 A1* | 6/2001 | Murphy | B65B 61/205 |
| | | | 53/445 |
| 2014/0372233 A1* | 12/2014 | Knecht | G06Q 20/20 |
| | | | 705/15 |
| 2016/0332128 A1* | 11/2016 | Abraham | B01F 35/92 |
| 2017/0014785 A1 | 1/2017 | Childers et al. | |
| 2017/0349425 A1 | 12/2017 | Kline et al. | |
| 2018/0315271 A1* | 11/2018 | Gharabegian | F03G 6/001 |
| 2018/0330566 A1 | 11/2018 | Sakhno | |
| 2021/0087045 A1* | 3/2021 | Carignan | B65B 61/025 |
| 2021/0225120 A1 | 7/2021 | Levine | |
| 2021/0358256 A1 | 11/2021 | Laverty | |
| 2022/0036439 A1 | 2/2022 | Martin | |
| 2022/0172549 A1* | 6/2022 | Chung | G06Q 20/3278 |

OTHER PUBLICATIONS

Contactless Food is Here, Jamba by Blendid, retrieved from URL: https://www.jamba.com/blendid, accessed on Jul. 26, 2023, 4 pages.

Nature & Nurture, Climate Action Challenge, retrieved from URL: WDCD Climate Challenge (whatdesigncando.com), accessed on Jun. 3, 2022, 24 pages.

SwarTea, Instagram Photos and Videos, retrieved from URL: https://www.instagram.com/swartea/?hl=en, accessed on Jul. 26, 2023, 4 pages.

TropifruitUS Smoothie Vending Machine, retrieved from URL: https://www.vendingmarketwatch.com/equipment/product/12282577/tropifruitus-tropifruitus-smoothie-vending-machine, accessed on Jul. 26, 2023, 4 pages.

Vend Smart and Stay Ahead, Intelligent Vending Machines, retrieved from URL: https://www.invendagroup.com/products/vending-machines/, accessed on Jul. 26, 2023, 11 pages.

* cited by examiner

CLOUD-BASED CONTACTLESS VENDING MACHINE

CROSS REFERENCE TO RELATED APPLICATION

This application claims the benefit under 35 U.S.C. § 119(e) of U.S. Provisional Application No. 63/390,231 entitled "CLOUD-BASED CONTACTLESS VENDING MACHINE" filed Jul. 18, 2022, which is incorporated herein by reference.

BACKGROUND

The preparation and dispensation of food and beverages is a predominantly human-mediated process. Preparing meals, snacks, beverages, etc. is a time-consuming process subject to imprecision due to variations introduced by the human preparer (e.g. measurement inaccuracy, imprecise heating, timing of operations such as heating, marinating, mixing, blending, etc.). These limitations can be overcome with the limited degree of automation or assistance that can provided through conventional coffee/espresso machines, vending machines, smoothie machines, and other similar machines.

Indeed, vending machines and smoothie machines are well known. Unfortunately, it is difficult to combine these types of machines because smoothies must be in constant mix to maintain the desired consistency of the suspension. Further, it is difficult to produce multiple flavors of smoothies.

Accordingly, it would be of great advantage to provide systems and techniques for combining the advantages of vending machines and smoothie machines in a manner that provides greater availability, precision and accuracy to the process, and avoid safety concerns, all the while conserving space and cost of a system capable of performing a wide variety of tasks useful in the context of smoothie preparation and dispensation.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a vending machine system includes a vending machine having an essentially cylindrical body with a liquid meal mixing and dispensing assembly, an automated lid assembly, an automated straw dispensing assembly, and a voice recognition component. A server connects to the vending machine over a network, the server having memory for storing computer instructions and a processor for executing the computer instructions, the computer instructions including instructions for implementing an ingredients recommendation application with an artificial intelligence module for recommending ingredients for liquid meals. The voice recognition component is configured to receive an order to prepare a liquid meal in a container, so that the automated lid assembly can apply a lid to the container and insert the straw therein. The voice recommendation component can send the order to the artificial intelligence module to obtain liquid meal ingredients recommendations therefrom.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The subject disclosure is directed to a cylindrical cloud-based contactless vending machine and, more particularly, to a system that includes a vending machine with a voice recognition component and an artificial intelligence software module for recommending ingredients for liquid meals. The vending machine can receive voice commands for orders to prepare liquid meals in a container. The vending machine is equipped with automated lid dispensers and automated straw dispensers.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

References to a "module", "a software module", and the like, indicate a software component or part of a program, an application, and/or an app that contains one or more routines. One or more independently modules can comprise a program, an application, and/or an app.

References to an "app", an "application", and a "software application" shall refer to a computer program or group of programs designed for end users. The terms shall encompass standalone applications, thin client applications, thick client applications, web-based applications, such as a browser, and other similar applications.

References to "Internet of Things" or "IoT" shall refer to smart systems and/or devices comprised of physical objects that are embedded with sensors, processing ability, software, and other technologies, and that connect and exchange data with other devices and systems over the Internet or other communications networks. The systems can represent a convergence of multiple technologies, including ubiquitous computing, commodity sensors, increasingly powerful embedded systems, and machine learning.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1:
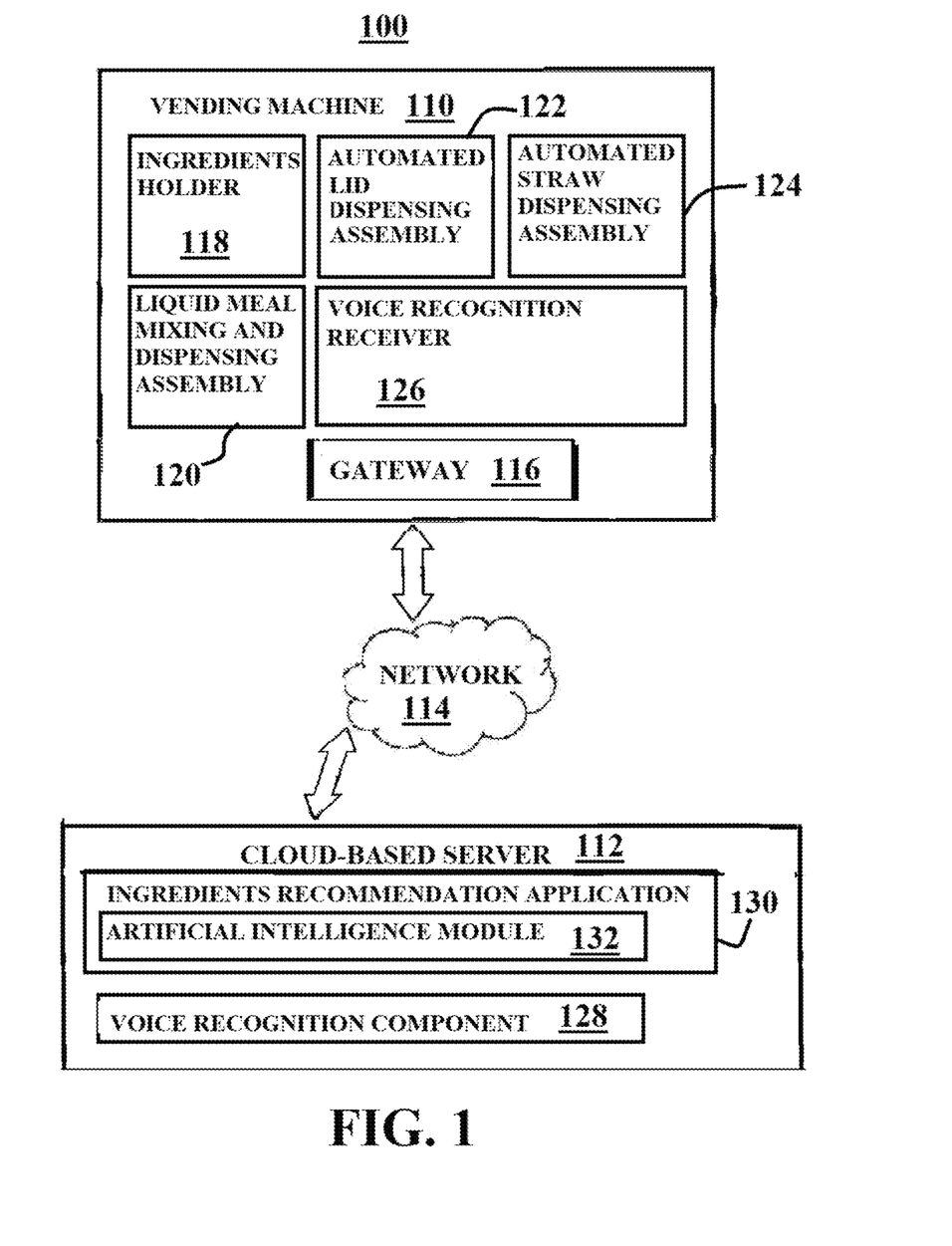
FIG. 1 is a block diagram of a cloud-based vending machine system in accordance with the subject disclosure.

Referring to the drawings and, particularly to FIG. 1, a vending machine system, generally designated by the numeral 100, is shown. The system 100 is a cloud-based contactless vending machine system that utilizes IoT technology to control the operations thereof. The vending machine system 100 includes a vending machine 110 and a cloud server 112 connected to the vending machine 110 over a network 114 through a gateway 116. In this exemplary embodiment, the gateway 116 can be an IOT gateway.

The vending machine 110 includes a cylindrical body that holds an ingredients holder 118, a liquid meal mixing and dispensing assembly 120, an automated lid dispensing assembly 122, an automated straw dispensing assembly 124, and a voice recognition receiver 126.

The liquid meal mixing and dispensing assembly 120 that performs many of the functions to prepare liquid meals, such as smoothies, that are described in co-pending U.S. Provisional Patent Application No. 63/335,242, filed Apr. 27, 2022, and U.S. Provisional Application No. 63/358,274, filed Jul. 5, 2022. The liquid meal mixing and dispensing assembly 120 receives ingredients from the ingredients holder 118 to prepare a liquid meal in a container.

The container can receive a lid from the automated lid dispensing assembly 122. The lid can receive a straw from the automated straw dispensing assembly 124. The automated lid dispensing assembly 122 is an automated lid machine. The automated straw dispensing assembly 124 is an automated straw machine.

The vending machine 110 can be activated by voice commands that are received by the voice recognition receiver 126. The voice recognition receiver 126 can convert vibrations of a person's voice into a wavelike electrical signal, which can be converted into a digital signal.

The voice commands, in the form of a digital signal, can be sent to a voice recognition component 128 that resides on the cloud server 112 for transcription thereon. The transcribed commands can be sent from the server 112 to the vending machine 110 in the form of food orders, specifically, liquid meal or smoothie orders.

The voice recognition component 128 can analyze the digital signal using speech recognition software components to register phonemes, units of sound that distinguish one word from another in a particular language. The phenomes are reconstructed into words. Exemplary speech recognition software components include the Speech-to-text API from Google Cloud by Alphabet Inc. of Mountain View, California, Automatic Speech Recognition (ASR) system from Nuance Communications of Burlington, Massachusetts, and the "Speech to text" API in IBM Watson by IBM of Armonk, New York. The voice recognition component 128 can use acoustic models, pronunciation models, language models or other suitable models.

The cloud server 112 can include an ingredients recommendation application 130 that includes an Artificial Intelligence (AI) module 132 that can provide customers with the ability to set an objective. Then, the AI module 132 can recommend the ingredients for a liquid meal or smoothie, which can be communicated from the cloud server 112 to the vending machine 110. Exemplary objectives include selecting ingredients to make liquid meals for lowering cholesterol, increasing ferric content, and losing weight.

The AI module 132 can have a trained AI model for recommending ingredients for smoothies. The AI module 132 can utilize an AI application and/or a machine learning application. The AI module 132 can emulate human thought and perform tasks in a real-world environment, namely identifying patterns, making decisions, and improving operations through experience and data. The AI module 132 can use deep learning, neural networks, computer vision, and natural language processing.

The system 100 and, specifically, the vending machine 110 is built in a modular fashion that provides the ability to replace each part within the vending machine 100 with the next generation of parts with replacing the vending machine 110 or the system 100 entirely.

Network 118 can be implemented by any type of network or combination of networks including, without limitation: a wide area network (WAN) such as the Internet, a local area network (LAN), a Peer-to-Peer (P2P) network, a telephone network, a private network, a public network, a packet network, a circuit-switched network, a wired network, and/or a wireless network. Computer systems and/or computing devices can communicate via network 116 using various communication protocols (e.g., Internet communication protocols, WAN communication protocols, LAN communications protocols, P2P protocols, telephony protocols, and/or other network communication protocols), various authentication protocols, and/or various data types (web-based data types, audio data types, video data types, image data types, messaging data types, signaling data types, and/or other data types).

In operation, the vending machine 110 prepares the liquid meal using the ingredients holder 118 and the liquid meal mixing and dispensing assembly 120. The ingredients holder 118 sends the ingredients for the liquid meal to the liquid meal mixing and dispensing assembly 120, where it is mixed and poured into a vessel.

The vessel is sent to the automated lid dispensing assembly 122, so that a lid can be placed thereon. Then, the automated straw dispensing assembly 124 inserts a straw through the lid into the vessel. Once the straw has been inserted into the vessel, the liquid meal can be dispensed from the vending machine 110.

Referring to FIGS. 2-11 with continuing reference to the foregoing figure, an exemplary embodiment of a vending machine, generally designated by the numeral 200, is shown. The vending machine 200 functions in the same manner as the vending machine 100 shown in FIG. 1.

Figure 2:
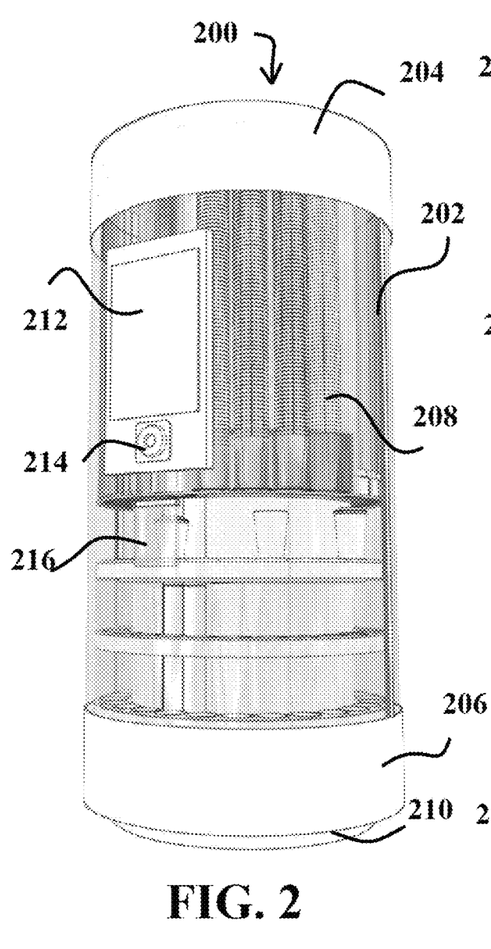
FIG. 2 is a perspective view of the exterior of an embodiment of the vending machine in accordance with the subject disclosure.
Figure 3:
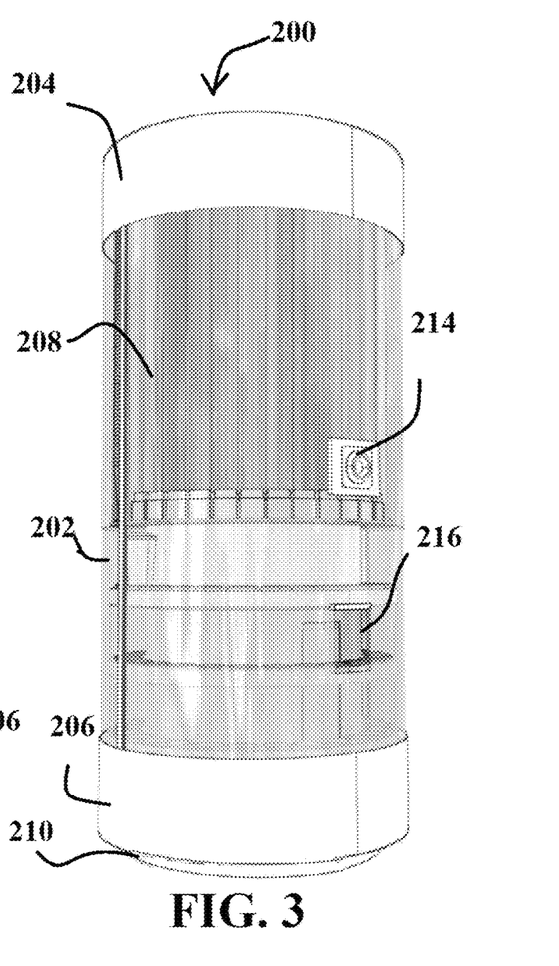
FIG. 3 is another perspective view of the exterior of the embodiment of the vending machine shown in FIG. 2.

As shown in FIGS. 2-3, the vending machine 200 has an essentially cylindrical body 202 that includes an upper portion 204, a lower portion 206, and a middle portion 208. The upper portion 204 and the lower portion 206 are formed from aluminum panels. The middle portion 208 includes a curved glass panel that can be translucent or transparent to provide the ability to view the interior of the vending machine 200. Alternatively, the panel can be opaque to prevent sunlight or other light sources from penetrating the interior of the vending machine 200 to protect the food stored therein.

The middle portion 208 can be an outer shell for the vending machine 200 that can include one or more hinged sections that can be opened to provide access to the interior of the vending machine 200 for refilling and for maintenance. The lower portion 206 rests upon an aluminum stand 210 to provide support and stability.

The middle portion 208 includes a display screen 212, a pair of input devices 214, and a pair of delivery compartments 216. In this exemplary embodiment, the display screen 212 can be configured to display menus, item lists, messages, and/or advertising material. The input devices 212 can be barcode scanners and/or the a voice recognition receiver, such as the voice recognition receiver 126 shown in FIG. 1. The delivery compartments 216 can provide access to ordered and/or to pre-ordered liquid meals.

Figure 4:
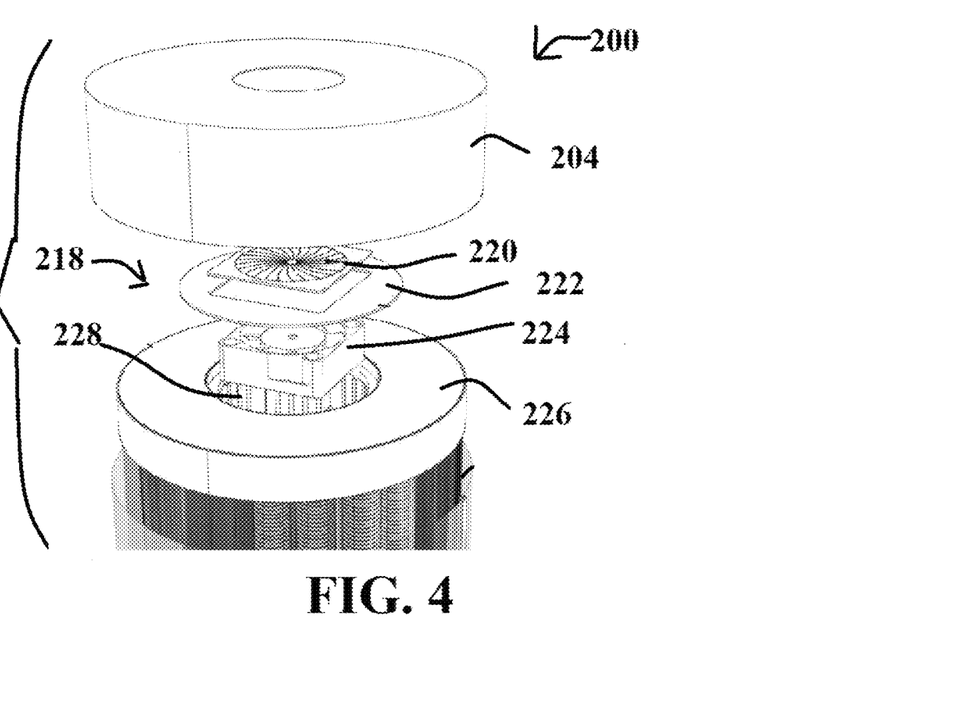
FIG. 4 is an exploded fragmentary perspective view of the top portion of the embodiment of the vending machine shown in FIG. 2.

As shown in FIG. 4, a fan assembly 218 is positioned below the upper portion 204. The fan assembly 218 can include an air intake 220, a fan holder 222, and a fan 224. The fan 224 abuts an insulation board 226. The fan 224 is supported by an internal support base 228.

Figure 5:
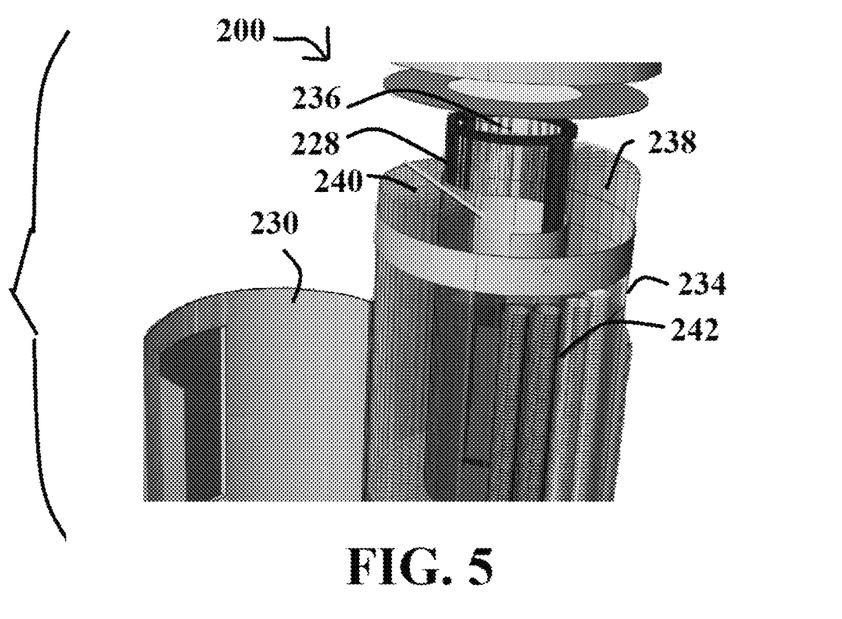
FIG. 5 is an exploded fragmentary perspective view of the interior of the embodiment of the vending machine shown in FIG. 2.
Figure 6:
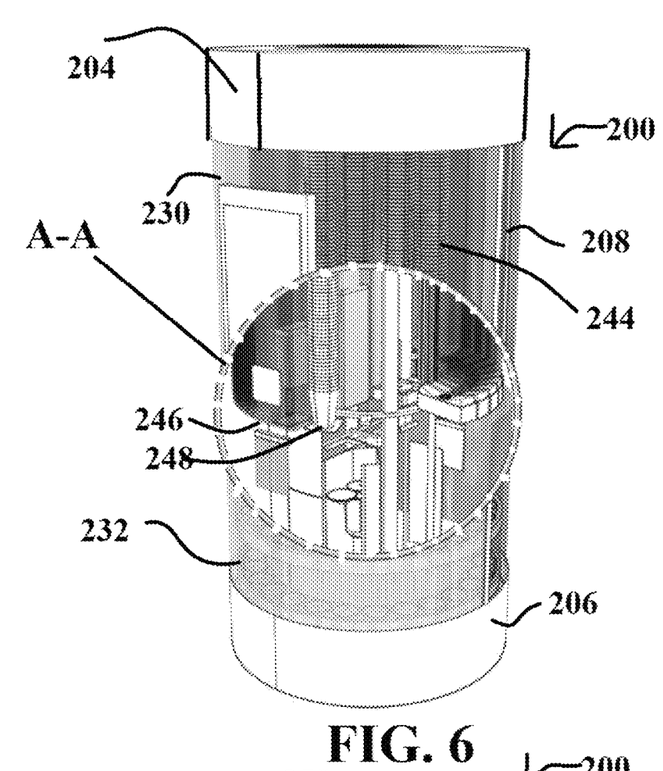
FIG. 6 is a fragmentary perspective view of the exterior of the embodiment of the vending machine shown in FIG. 2.
Figure 7:
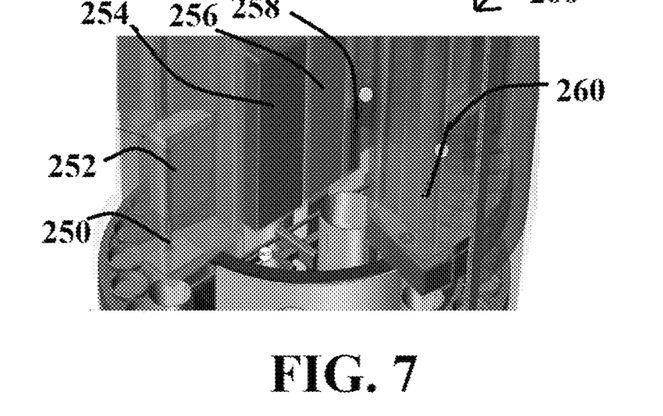
FIG. 7 is a fragmentary perspective view showing the interior of the embodiment of the vending machine shown in FIG. 6 within section A-A.

As shown in FIGS. 5-7, the middle portion 208 includes an upper door 230 and a lower door 232 that are pivotally connected to an external housing 234 with hinges. A peltier element 236 is positioned within the internal support base 228 adjacent to frozen ingredients containers 238, liquid ingredients containers 240, and a cup container box 242 for holding vessels for delivering the liquid meals, namely cup.

The cup container box 242 can hold cups of varying size. In this exemplary embodiment, the cup container box 242 holds small cups, medium sized cups, and large cups. The cup container box 242 includes a plurality of sleeves 244, a rail mount 246, and a cup dropper 248.

A blender 250 and a blender box 252 are mounted on the internal support base 228. A press box 254, a lid box 256, and a straw box 258 are mounted therein. An ingredients pack 260 is contained therein.

Figure 8:
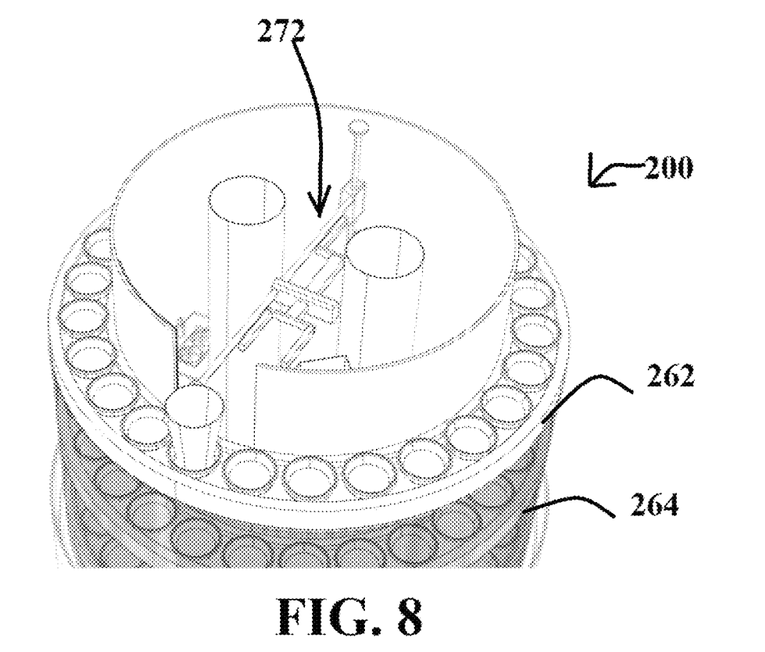
FIG. 8 is a fragmentary perspective view of the bottom portion of the embodiment of the vending machine shown in FIG. 2.
Figure 9:
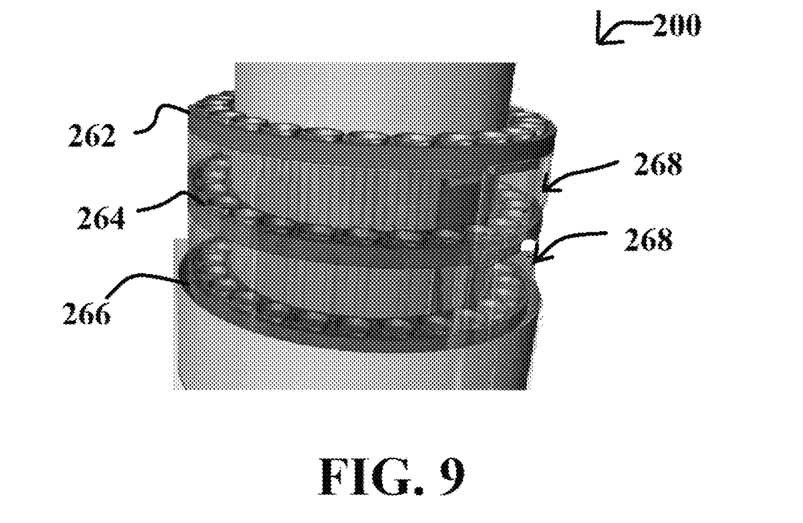
FIG. 9 is another fragmentary perspective view of the bottom portion of the embodiment of the vending machine shown in FIG. 2.
Figure 10:
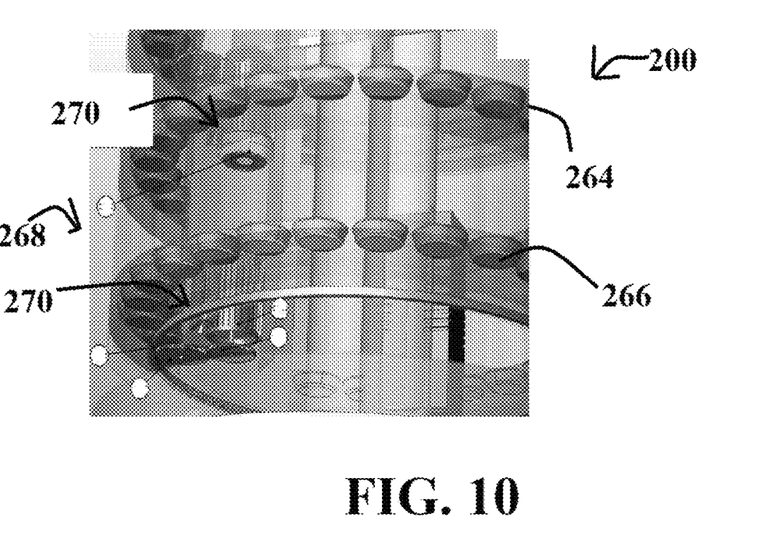
FIG. 10 is another fragmentary perspective view of the bottom portion of the embodiment of the vending machine shown in FIG. 2.

As shown in FIGS. 8-10, the interior of the vending machine 200 includes a plurality of rail assemblies 262-266 configured to convey cups containing the liquid meals from the blender 250 to one of the delivery compartments 216. In this exemplary embodiment, the rail assembly 262 delivers liquid meals that the subject of instant orders to the delivery compartments 215.

The rail assemblies 264-266 hold the cups within a pre-order container 268. The rail assemblies 262-266 can be rotated using electro motor and gear assemblies 270. A robotic arm assembly 272 can move cups from one of the rail assemblies 262-266 to another.

Figure 11:
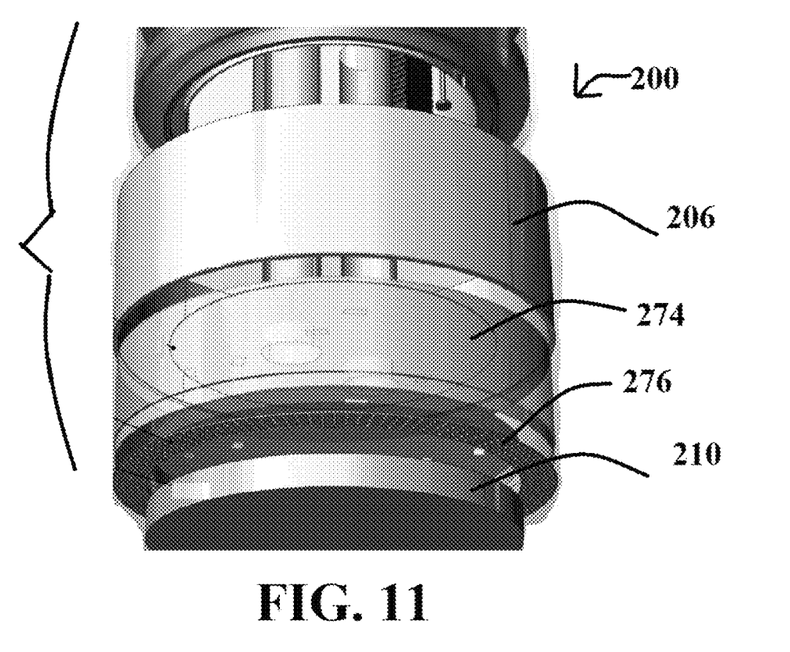
FIG. 11 is an exploded fragmentary perspective view of the bottom portion of the embodiment of the vending machine shown in FIG. 2.

As shown in FIG. 11, the lower portion 206 includes an air duct 274 and an air outlet 276 for providing ventilation for the vending machine 200.

Figure 12:
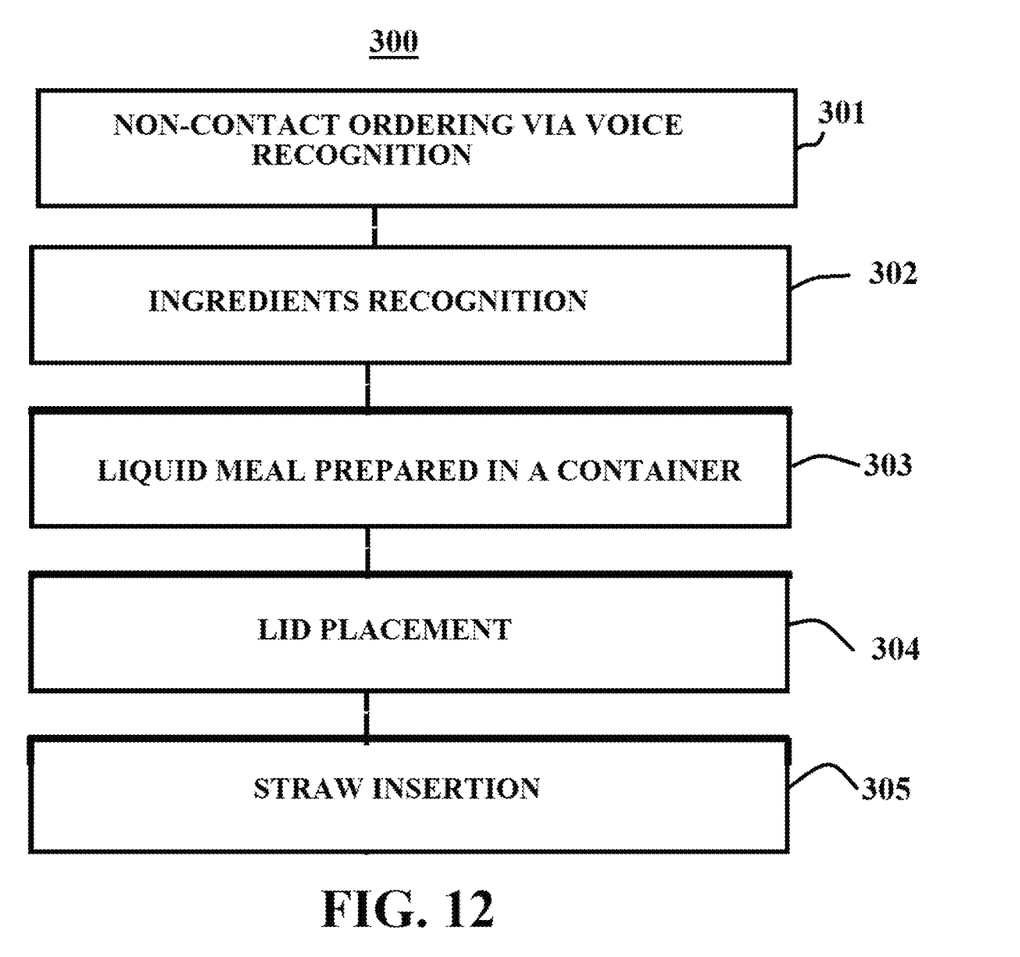
FIG. 12 is an exemplary process in accordance with the subject disclosure.

Referring to FIG. 12 with continuing reference to the foregoing figures, an exemplary process, generally designated by the numeral 300, for preparing a liquid meal is shown. The process 300 can be a performed within the system 100 shown in FIG. 1.

At 301, a system is provided for ordering liquid meals using voice recognition. In this exemplary embodiment, the system can be the system 100 shown in FIG. 1.

At 302, an artificial intelligence module can review an order and make ingredients recommendations. In this exemplary embodiment, the ingredients recommendations can be made by an ingredients recommendation application, such as the ingredients recommendation application 130 that includes AI module 132, as shown in FIG. 1.

At 303, a liquid meal is prepared in a container. In this exemplary embodiment, the liquid meal can be prepared by the liquid meal mixing and dispensing assembly 120 shown in FIG. 1.

At 304, a lid is placed on the container. In this exemplary embodiment, the lid can be placed by the automated lid dispensing assembly 122 shown in FIG. 1.

At 305, a straw is inserted into the lid. In this exemplary embodiment, the straw can be inserted into the lid by the automated straw dispensing assembly 124 shown in FIG. 1.

Exemplary Cloud Architecture

Figure 13:
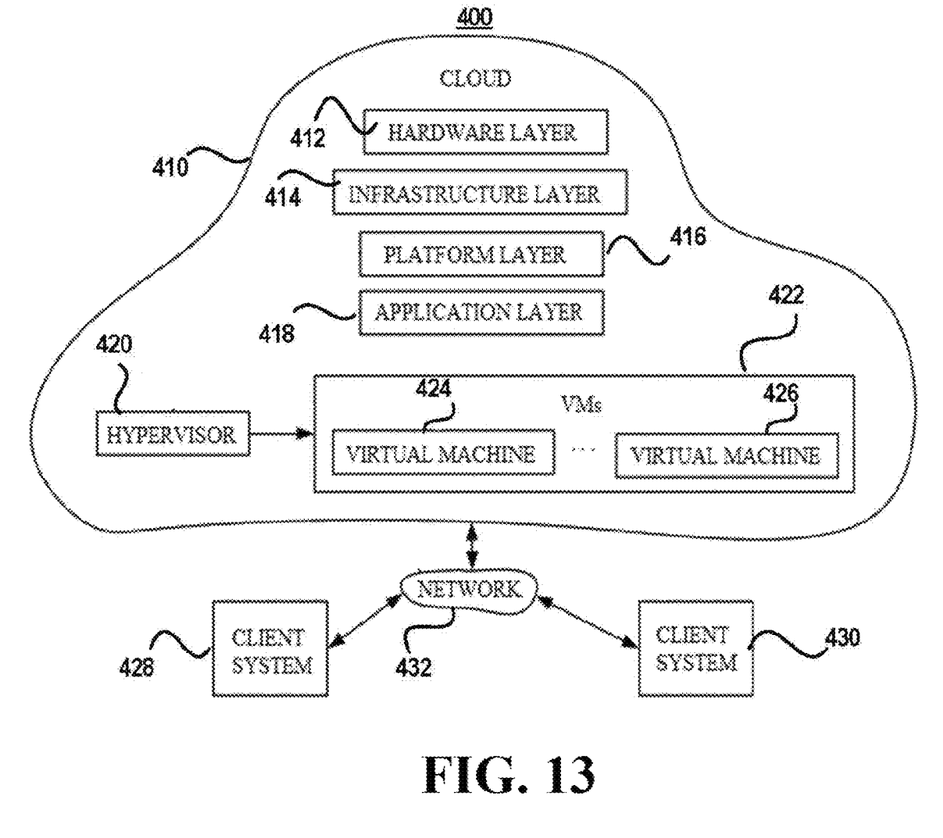
FIG. 13 is an exemplary cloud computing system in accordance with the subject disclosure.

Referring to FIG. 13 with continuing reference to the foregoing figures, exemplary cloud architecture, generally designated by the numeral 400, for implementing the system 100 shown in FIG. 1 and/or performing the process 300 shown in FIG. 12.

The exemplary cloud architecture 400 provides computation, software, data access, and storage services that do not require end-user knowledge of the physical location or configuration of the system that delivers the services. In various embodiments, cloud computing delivers the services over a wide area network, such as the internet, using appropriate protocols.

For instance, cloud computing providers deliver applications over a wide area network and they can be accessed through a web browser or any other computing component. Software or components of architecture 400 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

As shown in FIG. 13, the cloud architecture 400 includes a cloud 410. The cloud 410 (or each of the different premises on the cloud 410) can include a hardware layer 412, an infrastructure layer 414, a platform layer 416, and an application layer 418.

A hypervisor 420 can illustratively manage or supervise a set of virtual machines 422 that can include a plurality of different, independent, virtual machines 424-426. Each virtual machine can illustratively be an isolated software container that has an operating system and an application inside it. It is illustratively decoupled from its host server by hypervisor 420. In addition, hypervisor 420 can spin up additional virtual machines or close virtual machines, based upon workload or other processing criteria.

A plurality of different client systems 428-430 (which can be end user systems or administrator systems, or both) can illustratively access cloud 410 over a network 432. Depending upon the type of service being used by each of the client systems 428-430, cloud 410 may provide different levels of service. In one example, the users of the client systems are provided access to application software and databases. The cloud service then manages the infrastructure and platforms that run the application. This can be referred to as software as a service (or SaaS). The software providers operate application software in application layer 412 and end users access the software through the different client systems 428-430.

The cloud provider can also use platform layer 416 to provide a platform as a service (PaaS). This involves an operating system, programming language execution environment, database and webserver being provided to the client systems 428-430, as a service, from the cloud provider. Application developers then normally develop and run software applications on that cloud platform and the cloud provider manages the underlying hardware and infrastructure and software layers. In this exemplary embodiment, the cloud provider is Google.

The cloud provider can also use infrastructure layer 414 to provide infrastructure as a service (IaaS). In such a service, physical or virtual machines and other resources are provided by the cloud provider, as a service. These resources are provided, on-demand, by the IaaS cloud provider, from large pools installed in data centers. In order to deploy the applications, the cloud users that use IaaS install operating-system images and application software on the cloud infrastructure 400.

Exemplary Computer System

Figure 14:
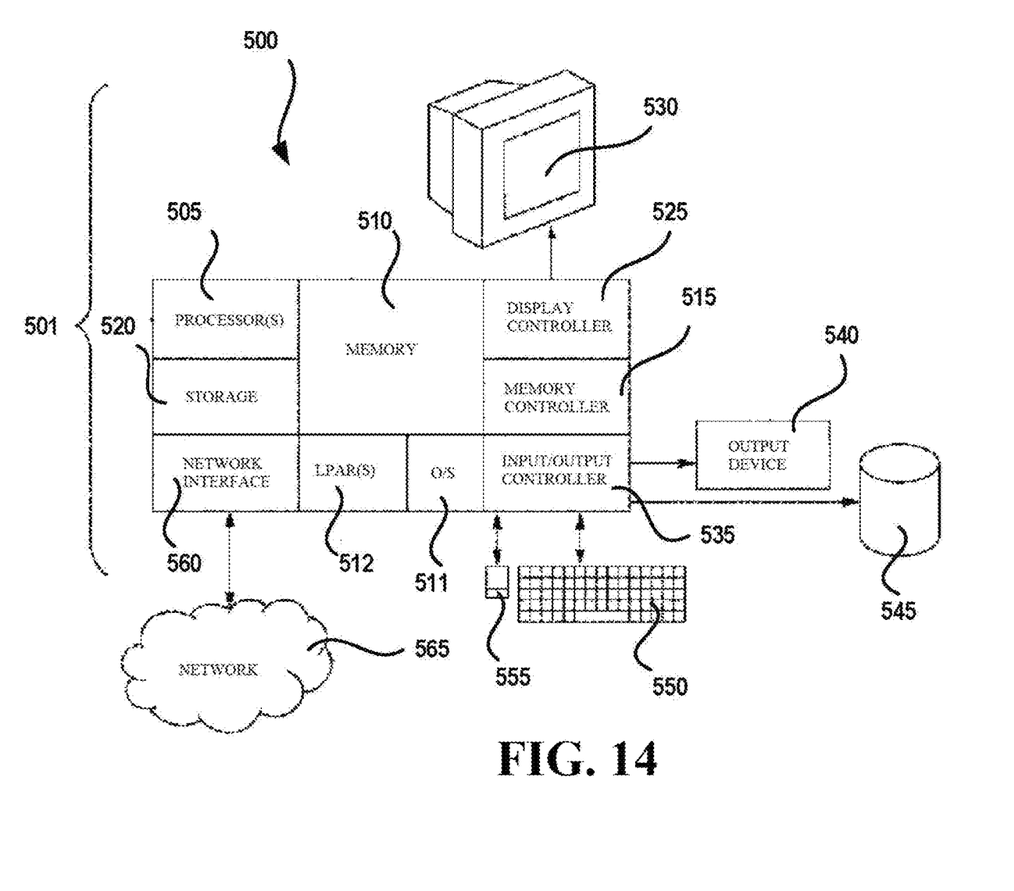
FIG. 14 is an exemplary computing device in accordance with the subject disclosure.

Referring now to FIG. 14 with continuing reference to the forgoing figures, a computer system for providing therapy to an autism patient is generally shown according to one or more embodiments. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 500 therefore can include general-purpose computer or mainframe 501 capable of running multiple instances of an O/S simultaneously.

In an exemplary embodiment, in terms of hardware architecture, as shown in FIG. 14, the computer 501 includes one or more processors 505, memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 can have additional elements, which are omitted for simplicity, such as controllers, buffers (caches), drivers, repeaters, and receivers, to enable communications. Further, the local interface can include address, control, and/or data connections to enable appropriate communications among the aforementioned components. The input/output controller 535 can include a plurality of sub-channels configured to access the output devices 540 and 545. The sub-channels can include fiber-optic communications ports.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 can incorporate electronic, magnetic, optical, and/or other types of storage media. Note that the memory 510 can have a distributed architecture, where various components are situated remote from one another, but can be accessed by the processor 505.

The instructions in memory 510 can include one or more separate programs, each of which comprises an ordered listing of executable instructions for implementing logical functions. In the example of FIG. 14, the instructions in the memory 510 a suitable operating system (OS) 511. The operating system 511 essentially controls the execution of other computer programs and provides scheduling, input-output control, file and data management, memory management, and communication control and related services. In accordance with one or more embodiments, the memory 510 and/or an I/O device 545 can be used to store the file attribute tables and the data layers.

The memory 510 can include multiple logical partitions (LPARs) 512, each running an instance of an operating system. The LPARs 512 can be managed by a hypervisor, which can be a program stored in memory 510 and executed by the processor 505.

In an exemplary embodiment, a conventional keyboard 550 and mouse 555 can be coupled to the input/output controller 535. Other output devices such as the I/O devices 540, 545 can include input devices, for example but not limited to, a printer, a scanner, microphone, and the like. Finally, the I/O devices 540, 545 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider.

When the computer 501 is in operation, the processor 505 is configured to execute instructions stored within the memory 510, to communicate data to and from the memory 510, and to generally control operations of the computer 501 pursuant to the instructions.

Supported Features and Embodiments

The detailed description provided above in connection with the appended drawings explicitly describes and supports various features of a cloud-based contactless vending machine. By way of illustration and not limitation, supported embodiments include a vending machine system comprising: a vending machine having an ingredients holder, a liquid meal mixing and dispensing assembly, an automated lid assembly, and an automated straw dispensing assembly; a server connecting with the vending machine over a network, the server having memory for storing computer instructions and a processor for executing the computer instructions, the computer instructions including instructions for implementing an ingredients recommendation application with an artificial intelligence module for recommending ingredients for liquid meals; and a voice recognition component residing on the server and being configured to receive an order to prepare a liquid meal in a container, so that the automated lid assembly can apply a lid to the container and insert the straw therein; wherein the voice recommendation component can send the order to the artificial intelligence module to obtain liquid meal ingredients recommendations therefrom.

Supported embodiments include the foregoing vending machine system, wherein the voice recognition component is configured to respond to a predetermine phrase to prepare the liquid meal.

Supported embodiments include any of the foregoing vending machine systems, wherein the artificial intelligence module can receive an objective from a user.

Supported embodiments include any of the foregoing vending machine systems, wherein the objective can include providing a liquid meal with ingredients for at least one of lowering cholesterol, increasing ferric content, and losing weight.

Supported embodiments include any of the foregoing vending machine systems, wherein the voice recognition component is configured to receive the objective.

Supported embodiments include any of the foregoing vending machine systems, wherein the vending machine is Internet-of-Things enabled.

Supported embodiments include any of the foregoing vending machine systems, wherein the vending machine includes a voice recognition receiver for communicating with the voice recognition component over the network.

Supported embodiments include any of the foregoing vending machine systems, wherein the vending machine includes an essentially cylindrical body.

Supported embodiments include a method for preparing a liquid meal comprising: providing vending machine having an ingredients holder, a liquid meal mixing and dispensing assembly, and a voice recognition receiver; connecting, over a network, the vending machine to a server having an artificial intelligence module residing thereon; receiving at least one voice command containing an order for a liquid meal through the voice recognition receiver; sending the at least one voice command to the server over the network, so that the artificial intelligence module can generate ingredients recommendations based upon the order; sending the ingredients recommendations to the vending machine over the network; and preparing a liquid meal based upon the ingredients recommendations with the ingredients holder and the liquid meal mixing and dispensing assembly for dispensation by the vending machine.

Supported embodiments include the foregoing method, wherein the preparing step includes: sending ingredients from the ingredients holder to the liquid meal mixing and dispensing assembly.

Supported embodiments include any of the foregoing methods, wherein the preparing step includes: mixing the ingredients within the liquid meal mixing and dispensing assembly.

Supported embodiments include any of the foregoing methods, wherein the preparing step includes: pouring the ingredients into a vessel within the liquid meal mixing and dispensing assembly.

Supported embodiments include any of the foregoing methods, wherein the preparing step includes: placing a lid on the vessel.

Supported embodiments include any of the foregoing methods, wherein the preparing step includes: inserting a straw through the lid.

Supported embodiments include any of the foregoing methods, wherein the server includes a voice recognition component residing thereon.

Supported embodiments include any of the foregoing methods, wherein the voice recognition component is configured to respond to a predetermine phrase to prepare the liquid meal.

Supported embodiments include any of the foregoing methods, wherein the at least one voice command includes an objective, further comprising: sending the objective to the artificial intelligence module.

Supported embodiments include any of the foregoing methods, wherein the objective can include providing a liquid meal with ingredients for at least one of lowering cholesterol, increasing ferric content, and losing weight.

Supported embodiments include a vending machine system comprising: a vending machine having an ingredients holder, a liquid meal mixing and dispensing assembly, and a voice recognition receiver; a server connecting with the vending machine over a network, the server having memory for storing computer instructions and a processor for executing the computer instructions for: implementing an artificial intelligence module on the server; receiving at least one voice command containing an order for a liquid meal through the voice recognition receiver; sending the at least one voice command to the server over the network, so that the artificial intelligence module can generate ingredients recommendations based upon the order; sending the ingredients recommendations to the vending machine over the network; and activating the vending machine to prepare a liquid meal based upon the ingredients recommendations with the ingredients holder and the liquid meal mixing and dispensing assembly.

Supported embodiments include the foregoing vending machine system, wherein the vending machine includes an essentially cylindrical body.

Supported embodiments include a device, an apparatus, a computer-readable storage medium, a computer program product and/or means for implementing any of the foregoing systems, methods, or portions thereof.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A vending machine system comprising:
    a vending machine having an ingredients holder, a liquid meal mixing and dispensing assembly, an automated lid assembly, and an automated straw dispensing assembly;
    a server connecting with the vending machine over a network, the server having memory for storing computer instructions and a processor for executing the computer instructions, the computer instructions including instructions for implementing an ingredients recommendation application with an artificial intelligence module for recommending ingredients for liquid meals; and
    a voice recognition component residing on the server and being configured to receive an order to prepare a liquid meal in a container;
    wherein the voice recommendation component can send the order to the artificial intelligence module to obtain liquid meal ingredients recommendations therefrom, and
    wherein after the order is received the liquid meal mixing and dispensing assembly mixes the liquid meal, the automated lid assembly applies a lid to the container, and the automated straw dispensing assembly inserts a straw through the applied lid into the container.

2. The vending machine system of claim 1, wherein the voice recognition component is configured to respond to a predetermine phrase to prepare the liquid meal.

3. The vending machine system of claim 1, wherein the artificial intelligence module can receive an objective from a user.

4. The vending machine system of claim 3, wherein the objective can include providing a liquid meal with ingredients for at least one of lowering cholesterol, increasing ferric content, and losing weight.

5. The vending machine system of claim 3, wherein the voice recognition component is configured to receive the objective.

6. The vending machine system of claim 1, wherein the vending machine is Internet-of-Things enabled.

7. The vending machine system of claim 1, wherein the vending machine includes a voice recognition receiver for communicating with the voice recognition component over the network.

8. The vending machine system of claim 1, wherein the vending machine includes an essentially cylindrical body.

9. A method for preparing a liquid meal comprising:
    providing vending machine having an ingredients holder, a liquid meal mixing and dispensing assembly, an automated lid assembly, an automated straw dispensing assembly and a voice recognition receiver;
    connecting, over a network, the vending machine to a server having an artificial intelligence module residing thereon;
    receiving, by the vending machine, at least one voice command containing an order for a liquid meal through the voice recognition receiver;
    sending, by the vending machine, the at least one voice command to the server over the network, so that the artificial intelligence module can generate ingredients recommendations based upon the order;
    receiving, by the vending machine, the ingredients recommendations over the network;
    preparing, by the vending machine, ingredients based upon the ingredients recommendations with the ingredients holder;
    mixing, by the vending machine, the ingredients to make the liquid meal with the liquid meal mixing and dispensing assembly;
    placing, by the vending machine, a lid on a vessel containing the liquid meal with the automated lid assembly; and
    inserting, by the vending machine, a straw through the lid into the vessel with the automated straw dispensing assembly.

10. The method of claim 9, wherein the preparing step includes:
    sending ingredients from the ingredients holder to the liquid meal mixing and dispensing assembly.

11. The method of claim 10, wherein the preparing step includes:
    pouring the ingredients into the vessel within the liquid meal mixing and dispensing assembly.

12. The method of claim 9, wherein the server includes a voice recognition component residing thereon.

13. The method of claim 12, wherein the voice recognition component is configured to respond to a predetermine phrase to prepare the liquid meal.

14. The method of claim 9, wherein the at least one voice command includes an objective, further comprising:
    sending the objective to the artificial intelligence module.

15. The method of claim 14, wherein the objective can include providing a liquid meal with ingredients for at least one of lowering cholesterol, increasing ferric content, and losing weight.

16. A vending machine system comprising:
- a vending machine having an ingredients holder, a liquid meal mixing and dispensing assembly, an automated lid assembly, an automated straw dispensing assembly and a voice recognition receiver;
- a server connecting with the vending machine over a network, the server having memory for storing computer instructions and a processor for executing the computer instructions for:
  - implementing an artificial intelligence module on the server;
  - receiving at least one voice command containing an order for a liquid meal through the voice recognition receiver;
  - sending the at least one voice command to the server over the network, so that the artificial intelligence module can generate ingredients recommendations based upon the order;
  - sending the ingredients recommendations to the vending machine over the network; and
  - activating the vending machine to prepare the liquid meal based upon the ingredients recommendations with the ingredients holder and the liquid meal mixing and dispensing assembly, wherein the liquid meal mixing and dispensing assembly mixes the liquid meal, the automated lid assembly applies a lid to a container containing the liquid meal, and the automated straw dispensing assembly inserts a straw through the applied lid into the container.

17. The vending machine system of claim 16, wherein the vending machine includes an essentially cylindrical body.

* * * * *